United States Patent
Guerrero et al.

(10) Patent No.: US 9,632,574 B2
(45) Date of Patent: Apr. 25, 2017

(54) DEVICE AND METHOD FOR AUTHENTICATING A USER

(71) Applicant: SONY CORPORATION, Tokyo (JP)

(72) Inventors: Marjorie Guerrero, Murrieta, CA (US); Sean Kennedy, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/665,177

(22) Filed: Oct. 31, 2012

(65) Prior Publication Data
US 2014/0123258 A1    May 1, 2014

(51) Int. Cl.
| | | |
|---|---|---|
| H04L 9/32 | (2006.01) | |
| G06F 21/00 | (2013.01) | |
| G06F 3/01 | (2006.01) | |
| G06F 3/0488 | (2013.01) | |
| G06F 21/31 | (2013.01) | |
| G06F 21/36 | (2013.01) | |

(52) U.S. Cl.
CPC .............. *G06F 3/01* (2013.01); *G06F 3/0488* (2013.01); *G06F 21/31* (2013.01); *G06F 21/36* (2013.01)

(58) Field of Classification Search
None
See application file for complete search history.

(56) References Cited

U.S. PATENT DOCUMENTS

| | | | | |
|---|---|---|---|---|
| 7,536,556 B2* | 5/2009 | Fedorova et al. | ............ | 713/183 |
| 7,657,849 B2* | 2/2010 | Chaudhri et al. | ............ | 715/863 |
| 8,046,721 B2* | 10/2011 | Chaudhri et al. | ............. | 715/863 |
| 8,402,533 B2* | 3/2013 | LeBeau et al. | ................. | 726/17 |
| 8,571,521 B2* | 10/2013 | Kim et al. | ..................... | 455/411 |
| 8,577,356 B2* | 11/2013 | Kornilovsky et al. | ........ | 455/418 |
| 8,607,331 B2* | 12/2013 | Sun et al. | ........................ | 726/19 |
| 8,631,487 B2* | 1/2014 | Griffin et al. | ................... | 726/19 |
| 8,671,058 B1* | 3/2014 | Isaacs | ............................. | 705/50 |
| 2004/0080529 A1* | 4/2004 | Wojcik | .................... | G06F 21/83 715/738 |
| 2005/0289645 A1* | 12/2005 | Hori | ...................... | G06F 21/608 726/7 |

(Continued)

FOREIGN PATENT DOCUMENTS

| | | |
|---|---|---|
| JP | 2012-109976 | 6/2012 |
| KR | 10-2009-0072096 | 7/2009 |
| KR | 10-2011-0069567 | 6/2011 |

OTHER PUBLICATIONS

Passtouch, LLC, Passtouch—Multi-User Web Browser for iPad, Product website (http://www.passtouch.com/index.html), 2011.

(Continued)

*Primary Examiner* — Christopher Revak
(74) *Attorney, Agent, or Firm* — Chip Law Group

(57) ABSTRACT

Certain aspects of a device and method for authenticating a user are disclosed. The device may display a first set of images and receive a user input. The received user input may comprise a set of gestures and a selection of a plurality of images from the first set of images in a pre-determined sequence. The selected plurality of images may be modified based on the set of gestures. The device compares the modified selected plurality of images with a second set of pre-stored images. The device may authenticate the user based on the comparison.

18 Claims, 14 Drawing Sheets

(56) References Cited

U.S. PATENT DOCUMENTS

| | | | | |
|---|---|---|---|---|
| 2006/0206918 | A1* | 9/2006 | McLean | G06F 21/36 726/2 |
| 2006/0218408 | A1* | 9/2006 | Serpa | 713/183 |
| 2008/0133347 | A1* | 6/2008 | Josifovski | G06F 17/30864 705/14.44 |
| 2008/0133348 | A1* | 6/2008 | Reed | G06Q 30/02 705/14.49 |
| 2008/0184360 | A1 | 7/2008 | Kornilovsky et al. | |
| 2009/0113294 | A1* | 4/2009 | Sanghavi et al. | 715/269 |
| 2009/0165121 | A1* | 6/2009 | Kumar | 726/19 |
| 2009/0172810 | A1* | 7/2009 | Won et al. | 726/19 |
| 2009/0235327 | A1* | 9/2009 | Jakobsson | G06F 21/31 726/2 |
| 2009/0249476 | A1* | 10/2009 | Seacat | 726/17 |
| 2010/0031330 | A1* | 2/2010 | Von Ahn | G06F 21/36 726/5 |
| 2010/0043062 | A1* | 2/2010 | Alexander | G06F 21/36 726/6 |
| 2010/0180336 | A1* | 7/2010 | Jones et al. | 726/19 |
| 2010/0257490 | A1 | 10/2010 | Lyon et al. | |
| 2010/0287382 | A1* | 11/2010 | Gyorffy | G06F 21/36 713/185 |
| 2010/0306055 | A1* | 12/2010 | Kolb | G06Q 30/0257 705/14.55 |
| 2011/0166916 | A1* | 7/2011 | Inbar | G06F 3/0481 705/14.4 |
| 2011/0247067 | A1* | 10/2011 | Hirose | 726/19 |
| 2011/0283353 | A1* | 11/2011 | Maetz et al. | 726/18 |
| 2012/0084450 | A1* | 4/2012 | Nagamati et al. | 709/229 |
| 2012/0084734 | A1 | 4/2012 | Wilairat | |
| 2012/0084854 | A1* | 4/2012 | Mualem | G06F 21/36 726/18 |
| 2012/0124644 | A1* | 5/2012 | LeBeau et al. | 726/3 |
| 2012/0159593 | A1* | 6/2012 | Griffin et al. | 726/7 |
| 2012/0159615 | A1* | 6/2012 | Griffin et al. | 726/19 |
| 2012/0159616 | A1* | 6/2012 | Griffin et al. | 726/19 |
| 2012/0210393 | A1* | 8/2012 | Yamahara | 726/2 |
| 2012/0291120 | A1* | 11/2012 | Griffin | 726/19 |
| 2013/0036461 | A1* | 2/2013 | Lowry | 726/19 |
| 2014/0075549 | A1* | 3/2014 | Lewis | G06F 21/31 726/19 |

OTHER PUBLICATIONS

Elise G. McIntoch, Protect your privacy with Passtouch, Article, SILive.com (http://blog.silive.com/relationships/2012/06/protect_your_privacy_with_pass.html), Jun. 5, 2012.

Bill French, Passtouch Announces a New "Signature Type" Password Privacy Web Browser App That was Designed Specifically for Mobile Touch Screen Devices Like iPad, Article, IPad CTO (http://ipadcto.com/2012/04/18/passtouch-announces-a-new-signature-type-password-privacy-web-browser-app-that-was-designed-specifically-for-mobile-touch-screen-devices-like-the-ipad/), Apr. 18, 2012.

Vincent Danen, Get increased Password Protection on the iPhone, Apple in the Enterprise blog (http://www.techrepublic.com/blog/mac/get-increased-password-protection-on-the-iphone/499), May 17, 2010.

Korean Office Action issued on Feb. 25, 2015 in patent application No. 10-2013-117967.

* cited by examiner

DEVICE AND METHOD FOR AUTHENTICATING A USER

CROSS-REFERENCE TO RELATED APPLICATIONS/INCORPORATION BY REFERENCE

None.

FIELD

Certain embodiments of the disclosure relate to user authentication. More specifically, certain embodiments of the disclosure relate to device and method for authenticating a user to enable the device.

BACKGROUND

With the advent of new-generation consumer electronic (CE) devices (such as touch compatible CE devices, smartphones, handheld personal digital assistants (PDAs), need for physical keyboards has reduced. The new-generation CE devices are using virtual keyboards and high-end user interfaces instead. The virtual keyboards and the high-end user interfaces may be used to provide input data for user authentication, but are not always convenient.

Further limitations and disadvantages of conventional and traditional approaches will become apparent to one of skill in the art, through comparison of such systems with some aspects of the present disclosure as set forth in the remainder of the present application with reference to the drawings.

SUMMARY

A device and/or a method is provided for authenticating a user substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
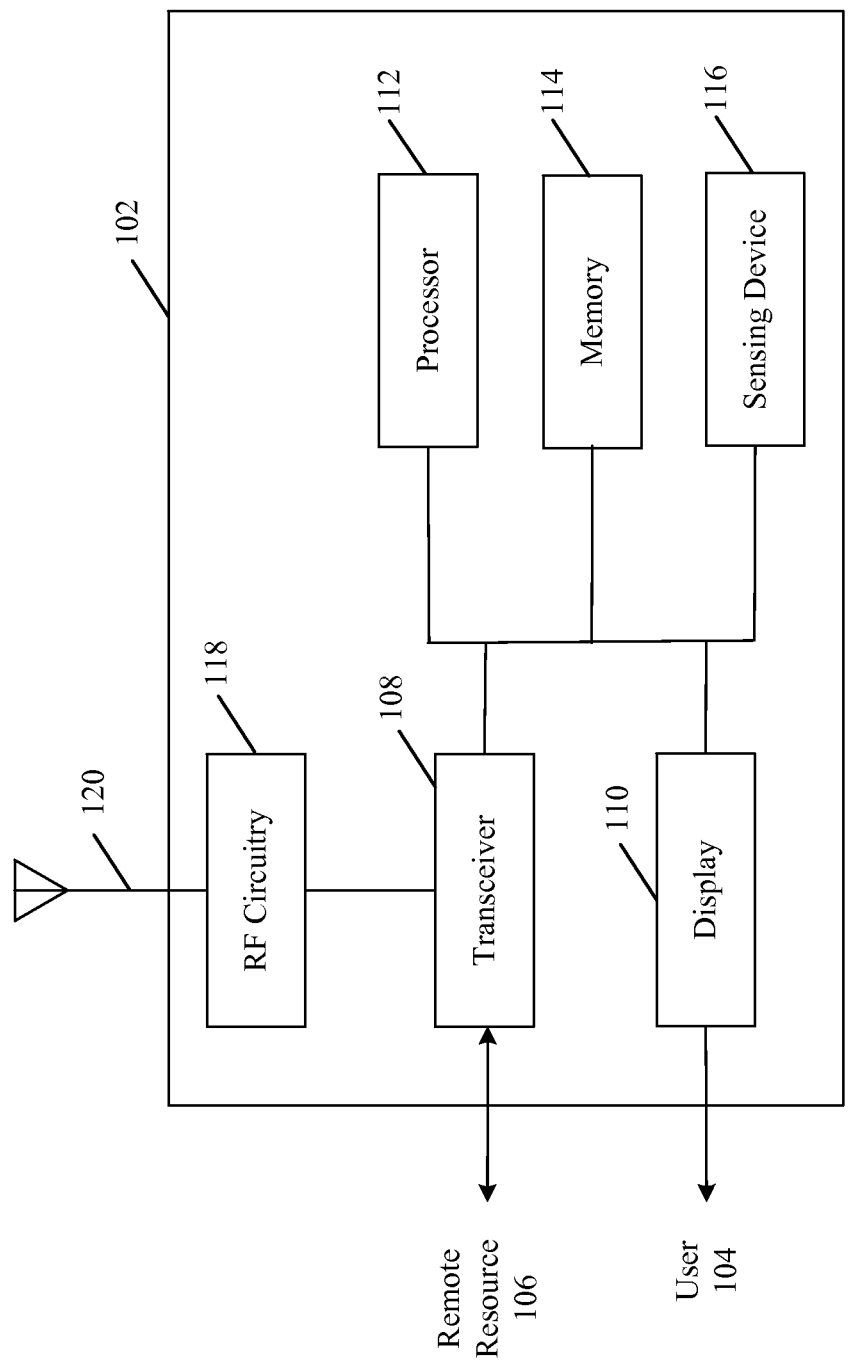
FIG. 1 is a block diagram of an exemplary device, in accordance with an embodiment of the disclosure.

Certain implementations may be found in a device and/or a method for authenticating a user. Exemplary aspects of the disclosure may comprise a device to display a first set of images and receive a user input. The user input may comprise a set of gestures and a selection of a plurality of images from the first set of images in a pre-determined sequence. The plurality of images may be modified based on the set of gestures. The device may compare the modified plurality of images with a second set of pre-stored images. The device may authenticate the user based on the comparison. Accordingly, the device may enable the user to perform one or more of locking the device, locking one or more features of the device, locking one or more applications of the device, unlocking the device, unlocking one or more features of the device, unlocking one or more applications of the device, and/or launching one or more applications in the device.

The device may be one of a touch screen device, a tablet, a personal digital assistant (PDA), a touchpad device, a smartphone, or a conventional desktop monitor. The set of gestures may comprise one or more of hand gestures, finger gestures, facial gestures and/or body gestures. The modification of the selected plurality of images may comprise one or more of rotating one or more of the selected plurality of images, flipping one or more of the selected plurality of images, clipping one or more of the selected plurality of images, and/or generating a collage of one or more of the selected plurality of images. The collage may be generated based on selection and combination of the one or more of the selected plurality of images in a pre-determined sequence, position or shape. The device may receive from the user the second set of pre-stored images in a pre-determined sequence during a configuration of the device. The device stores in a memory, the second set of pre-stored images in the pre-determined sequence during the configuration of the device. The device further receives from the user, a degree of complexity for one or more applications during the configuration of the device.

In accordance with an embodiment, the device may display a set of images to the user. At least a portion of the set of images may comprise alphanumeric text. A user input may comprise a selection of a plurality of images from the displayed set of images, in a pre-determined sequence. The device may extract the alphanumeric text from the selected plurality of images in a sequence. The device may then compare the sequence of extracted alphanumeric text with a pre-stored sequence of alphanumeric text. Based on the comparison, the device may authenticate the user and thus enable the user to perform one or more of locking or unlocking the device, locking or unlocking one or more features and/or applications of the device, and/or launching one or more applications in the device. The user input may comprise a set of gestures for selecting the plurality of images. The set of gestures may comprise one or more of hand gestures, finger gestures, facial gestures and/or body gestures.

In an embodiment, the device may display a first set of images and a pre-stored message. A user input may comprise a set of gestures and a selection of a plurality of images from the first set of images in a pre-determined sequence based on the set of gestures and the pre-stored message is received from the user. The selected plurality of images may be compared with a second set of pre-stored images corresponding to the pre-stored message. Based on the comparison, the device may authenticate the user and thus enable the user to perform one or more of locking or unlocking the device, locking or unlocking one or more features and/or applications of the device, and/or launching one or more applications in the device.

The device may associate a plurality of images in the second set of pre-stored images with the pre-stored message during a configuration of the device. The plurality of images in the second set of pre-stored images may include a plurality of personal images uploaded by the user.

FIG. 1 is a block diagram of an exemplary device, in accordance with an embodiment of the disclosure. Referring to FIG. 1, there is shown a device 102. The device 102 is associated with a user 104, and comprises a display 110. The display 110, for example a touch-sensitive display, can act both as an input means to accept a set of input from the user 104 and as an output means to display a sequence of user interfaces to the user 104. The device 102 may be connected to a remote resource 106, via a transceiver 108. The device 102 may also comprise one or more processors, such as a processor 112, a memory 114, one or more authentication devices, such as a sensing device 116, and Radio Frequency (RF) circuitry 118. The processor 112 may be coupled to the transceiver 108, the display 110, the memory 114, and the sensing device 116.

The device 102 may comprise suitable logic, circuitry, interfaces, and/or code that may be operable to display a sequence of user interfaces. Examples of the device 102 may include, but are not limited to, a touch screen device, a laptop, a tablet computer, a smartphone, and a personal digital assistant (PDA) device. In an embodiment, the device 102 may include an application that enables the device 102 to interpret a user input received from the user 104. In an embodiment, the application may be installed by a manufacturer of the device 102. In another embodiment, the user 104 may install the application on the device 102. The application may provide the user 104 a platform to enable the device 102 to communicate with the user 104. In an embodiment, the device 102 may also implement various remote communication protocols for transmission/reception of data and instructions to/from the remote resource 106 using the transceiver 108 and the RF circuitry 118. For accessing the remote resource 106, any known remote communication protocol may be used without limiting the scope of the disclosure.

The user 104 may operate the device 102 as a system administrator. In an embodiment, the user 104 may be an owner of the device 102. The user 104 may configure a personal computing environment that includes the device 102.

The remote resource 106 may comprise suitable logic, circuitry, interfaces, and/or code that may be pre-configured to store data (hereinafter referred to as a/the set of pre-stored data). The set of pre-stored data may comprise alphanumeric and non-alphanumeric data. The non-alphanumeric data may comprise a plurality of images and a set of gestures, for example, hand gestures, finger gestures, facial gestures, and/or body gestures. The non-alphanumeric data may further comprise speech (or audio) input. In an embodiment, the remote resource 106 may be connected to the device 102 via the transceiver 108. In another embodiment, the remote resource 106 may be integrated with the memory 114 of the device 102. The remote resource 106 may be implemented using several technologies that are well known to those skilled in the art. Some examples of these technologies may include, but are not limited to, MySQL® and Microsoft SQL®.

The transceiver 108 may comprise suitable logic, circuitry, interfaces, and/or code that may be operable to communicate with the remote resource 106 through a communication network. The transceiver 108 may implement known technologies to support wired or wireless communication of the device 102 with the communication network. In particular, a communication interface of the transceiver 108 may be a wireless or a wired interface.

In an embodiment, in response to the user input from the display 110, the transceiver 108 transmits the received user input to the remote resource 106. The remote resource 106 compares the user input with the set of pre-stored data and generates a result of the comparison. The result of the comparison may be an approval or disapproval of authentication of the user 104. The transceiver 108 receives the result of the comparison and communicates the result to the user 104 via the display 110. The transceiver 108 may transmit and receive the set of user input and the results of the comparison respectively, in accordance with various known secure communication protocols.

The display 110 may comprise suitable logic, circuitry, interfaces, and/or code that may be operable to receive one or more sets of user input from the user 104. The display 110 also displays a sequence of user interfaces associated with the device 102, one or more features of the device 102, and/or one or more applications of the device 102, to the user 104. The display 110 may be realized through several known technologies such as, but not limited to, Liquid Crystal Display (LCD) display, Light Emitting Diode (LED) display, and Organic LED (OLED) display technology. Further, the display 110 may be a touch-sensitive screen that may receive the user input from the user 104 by means of, for example, a virtual keypad, a stylus, a touch screen, and/or gestures.

The processor 112 may comprise suitable logic, circuitry, and/or interfaces that may be operable to execute at least one code section stored in the memory 114. The processor 112 may be realized through a number of processor technologies known in the art. Examples of processor 112 may be an X86 processor, a RISC processor, an ASIC processor, a CISC processor, or any other processor.

In an embodiment, the processor 112 may access the remote resource 106, via the transceiver 108, to compare the user input with the set of pre-stored data in the remote resource 106. Based on results returned by the remote resource 106, the processor 112 determines whether or not to authenticate the user 104.

The memory 114 may comprise suitable logic, circuitry, and/or interfaces that may be operable to store a machine code and/or a computer program having at least one code section executable by the processor 112. The memory 114 may further be operable to store data, such as the set of pre-stored data, one or more passkeys (for the user 104 configured to operate as a system administrator), one or more user profiles (one of the one or more user profiles corresponding to the user 104), and/or any other data. Examples of implementation of the memory 114 may include, but are not limited to, Random Access Memory (RAM), Read Only Memory (ROM), Hard Disk Drive (HDD), and a Secure Digital (SD) card.

In an embodiment, the processor 112, and the memory 114 may reside locally in the device 102. The processor 112 compares the user input with the set of pre-stored data stored in the memory 114. For a successful comparison, when the user input matches with a plurality of the set of pre-stored data, the processor 112 provides an authorization to the user 104.

The sensing device 116 may comprise suitable logic, circuitry, and/or interfaces that may be operable to store a machine code and/or a computer program having at least one code section executable by the processor 112. The sensing device 116 includes one or more sensors to confirm a recognition, identification and/or verification of the user 104. In an embodiment, the verification may be a pre-requisite for authentication of the user 104 providing the user input. The one or more sensors may include a camera to detect at least one of the following of the user 104: a fingerprint, palm geometry, a two- or three-dimensional facial profile, characteristic features of iris, and/or a retinal scan of the user 104. The one or more sensors may further include a thermal camera to capture thermal radiations (or thermograms) of the user 104, and a microphone to detect a voice pattern of the user 104.

The sensing device 116 may implement various known algorithms for user recognition, user identification and/or user verification. Examples of such algorithms include, but are not limited to, algorithms for face recognition, voice recognition, iris recognition, password matching, and fingerprint matching. It would be appreciated by those skilled in the art that any unique characteristic of the user may be accepted as a user input for identification purposes at least in the ongoing context.

The RF circuitry 118 converts electrical signals to/from the device 102 and communicates with communication networks and other communication devices via electromagnetic waves. The RF circuitry 118 may include, but is not limited to, an antenna 120, an RF transceiver, one or more amplifiers, a tuner, one or more oscillators, a digital signal processor, a coder-decoder (CODEC) chipset, a subscriber identity module (SIM) card, a memory, and/or the like. The RF circuitry 118 may communicate via wireless communication with networks, such as the Internet, an Intranet and/or a wireless network, such as a cellular telephone network, a wireless local area network (LAN) and/or a metropolitan area network (MAN), and other devices. The wireless communication may use any of a plurality of communication standards, protocols and technologies including, but not limited to, Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, Short Message Service (SMS), and/or the like.

The communication network is a medium through which various devices (including the device 102) communicate with each other. The touch screen device can connect to the communication network in accordance with various wired and wireless communication protocols, such as, Transmission Control Protocol and Internet Protocol (TCP/IP), Customer/User Datagram Protocol (UDP), Hypertext Transfer Protocol (HTTP), File Transfer Protocol (FTP), ZigBee, EDGE, Infra Red (IR), IEEE 802.11, 802.16, Bluetooth (BT) communication protocols.

In operation, the user 104 may perform one or more activities on one or more parts of the device 102 that is pre-configured with the set of pre-stored data. The user 104 may perform the one or more activities only after being authenticated to access the one or more parts, features, and/or applications of the device 102. The one or more activities may comprise locking and/or unlocking the device 102, locking and/or unlocking the one or more features or applications of the device 102, and/or launching one or more applications in the device 102.

In various embodiments, the device 102 is pre-configured with the set of pre-stored data and an associated degree of complexity of performing the one or more activities. The associated degree of complexity may be a simple level, a semi-difficult level, and a difficult level. The chosen level depends on the level of security required by the user 104 for the one or more parts of the device 102. For example, for a simple level, the degree of complexity associated with a subset of the set of pre-stored data may include a combination of an image, a set of numbers and a date. For a user designated as a high-end network administrator, the degree of complexity associated with a subset of the set of pre-stored data may include a combination of a plurality of images in a pre-defined sequence, prior or subsequent to one or more gestures. However, for a user designated as a top official of a top-secret military agency, the degree of complexity associated with a subset of the set of pre-stored data may include a set of manipulated images in a pre-defined sequence, in combination with one or more gestures, and/or one or more non-alphanumeric input, such as, biometric data. The biometric data may include, but not limited to, fingerprints, palm configuration, eye/iris image, body temperature and voice pattern. Notwithstanding, the disclosure may not be limited only to the above examples of the biometric data.

In an embodiment, the sensing device 116 confirms the recognition, identification, and verification of the user 104. The sensing device 116, such as a camera, a fingerprint scanner, a palm scanner, an eye/iris image scanner, a thermogram, a microphone, and/or the like, may detect (or recognize) one or more biometric data of the user 104. The detected biometric data is verified with the one or more user profiles in the memory 114. Once verified, the user 104 is declared as an identified user and thereafter the device 102 displays a lock interface to the user 104.

Figure 2:
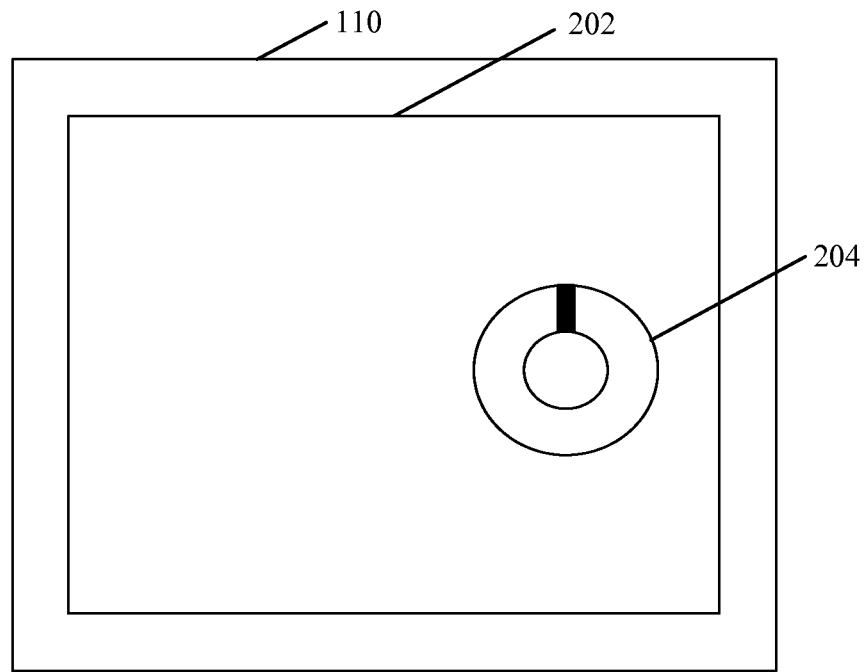
FIG. 2 illustrates a lock user interface and a combination lock on an exemplary device, in accordance with an embodiment of the disclosure.

FIG. 2 illustrates a lock user interface and a combination lock on an exemplary device, in accordance with an embodiment of the disclosure. The diagram of FIG. 2 is described in conjunction with the block diagram of FIG. 1.

Referring to FIG. 2, a virtual gesture combination lock user interface (VGC lock UI) 202, comprising a virtual gesture combination lock (VGC lock) 204 icon is shown. The VGC lock 204 may mimic a physical combination safe lock that is used to perform one or more activities (i.e. locking and unlocking) on one or more parts of a device. The VGC lock 204 may be dialed by the user 104 in a clockwise or counter-clockwise direction to provide the user input to the device 102.

In an embodiment, the VGC lock UI 202 may further comprise one or more textual, graphical or any combined visual indications of an unlock action that the user 104 may be required to perform to access the device 102. For example, the VGC lock 204 may appear as a safe lock on the display 110. The user 104 may be prompted to dial a set of input in a pre-determined sequence for performing one or more activities on one or more parts of the device 102.

Figure 3A:
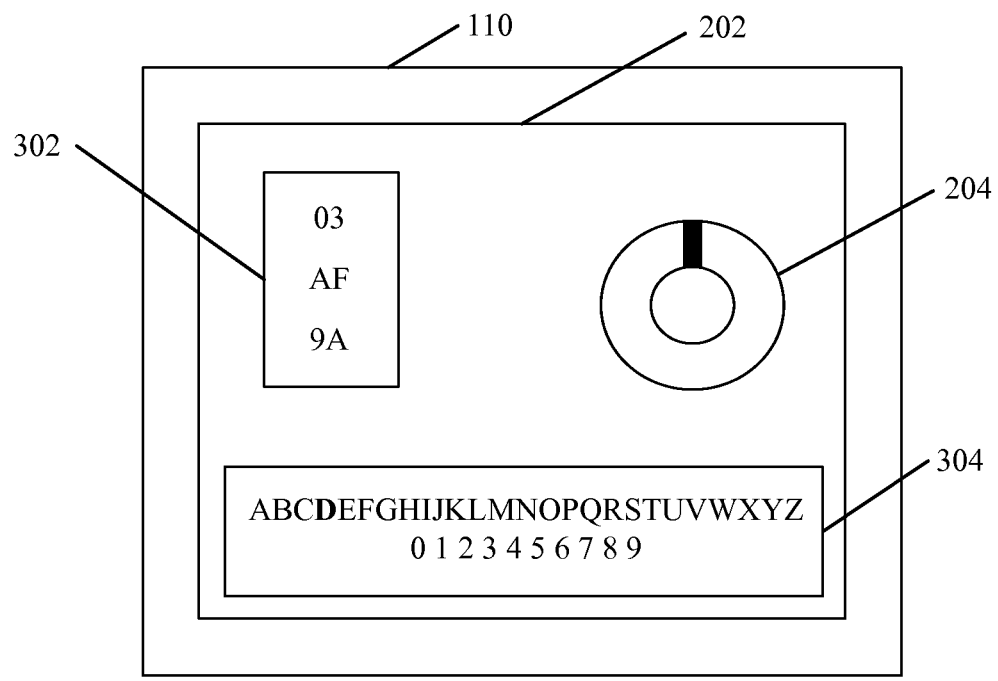
FIG. 3a is a diagram illustrating an exemplary lock user interface based on an alphanumeric input and a gesture input, in accordance with an embodiment of the disclosure.

FIG. 3a is a diagram illustrating an exemplary lock user interface based on an alphanumeric input and a gesture input, in accordance with an embodiment of the disclosure. The diagram of FIG. 3a is described in conjunction with the block diagram of FIG. 1 and FIG. 2.

Referring to FIG. 3a, the VGC lock UI 202 is shown. The VGC lock 204 prompts the user 104 to select an alphanumeric input 302 from a set of alphanumeric characters 304. When the alphanumeric input 302 matches the set of pre-stored data, the user 104 is authenticated for the VGC lock UI 202. The authentication may enable the user 104 to perform the one or more activities on the one or more parts of the device 102.

Figure 3B:
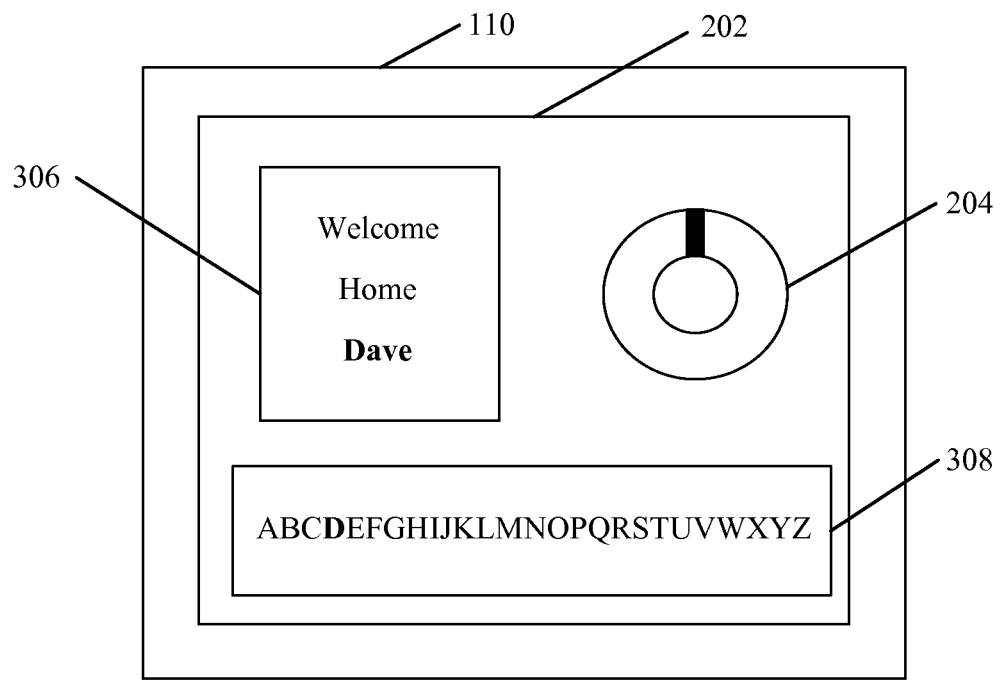
FIG. 3b is a diagram illustrating an exemplary lock user interface based on a word pattern and a gesture input, in accordance with an embodiment of the disclosure.

FIG. 3b is a diagram illustrating an exemplary lock user interface based on a word pattern and a gesture input, in accordance with an embodiment of the disclosure. The diagram of FIG. 3b is described in conjunction with the block diagram of FIG. 1 and FIG. 2.

Referring to FIG. 3b, the VGC lock UI 202 is shown. The VGC lock 204 prompts the user 104 to select a sequence of words 306 from a set of alphabets 308. When the sequence of words 306 matches the set of pre-stored data, the user 104 is authenticated for the VGC lock UI 202. The authentication enables the user 104 to perform the one or more activities on the one or more parts of the device 102.

Figure 3C:
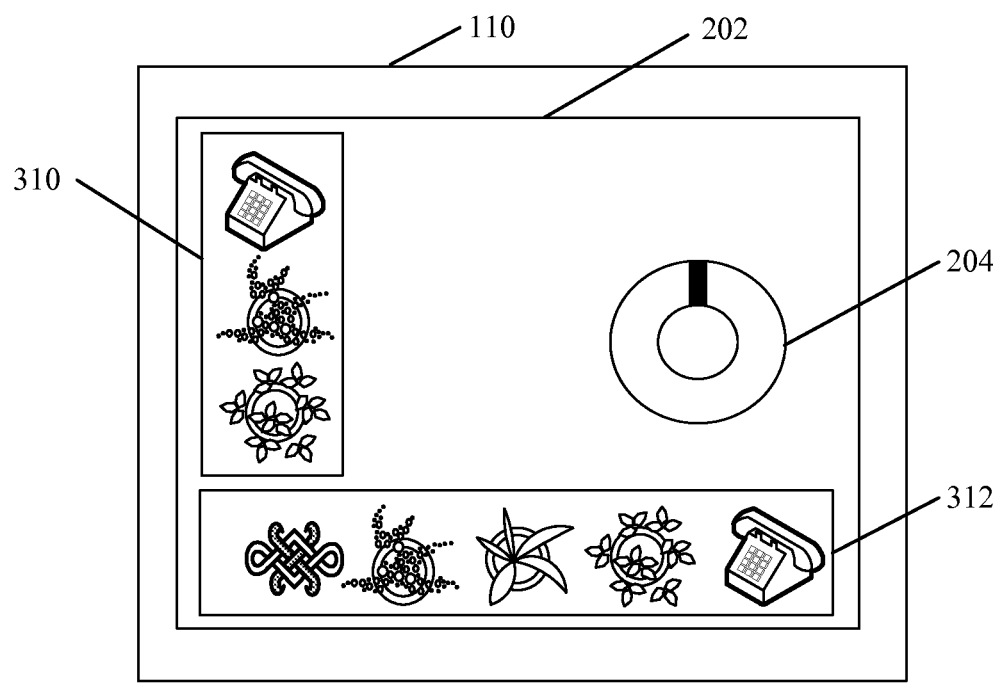
FIG. 3c is a diagram illustrating an exemplary lock user interface based on an image pattern and a gesture input, in accordance with an embodiment of the disclosure.

FIG. 3c is a diagram illustrating an exemplary lock user interface based on an image pattern and a gesture input, in accordance with an embodiment of the disclosure. The diagram of FIG. 3c is described in conjunction with the block diagram of FIG. 1 and FIG. 2.

Referring to FIG. 3c, the VGC lock UI 202 is shown. The VGC lock 204 prompts the user 104 to select a sequence of images 310 from a set of images 312. When the sequence of images 310 matches the set of pre-stored data, the user 104 is authenticated for the VGC lock UI 202. The authentication enables the user 104 to perform the one or more activities on the one or more parts of the device 102.

Figure 3D:
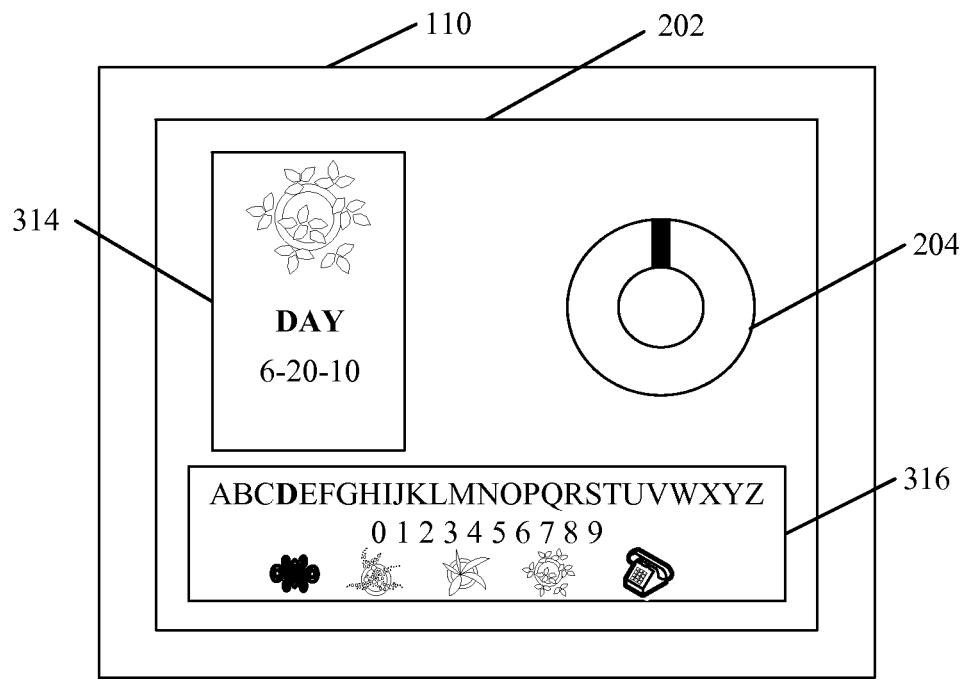
FIG. 3d is a diagram illustrating an exemplary lock user interface based on a combination pattern and a gesture input, in accordance with an embodiment of the disclosure.

FIG. 3d is a diagram illustrating an exemplary lock user interface based on a combination pattern and a gesture input, in accordance with an embodiment of the disclosure. The diagram of FIG. 3d is described in conjunction with the block diagram of FIG. 1 and FIG. 2.

Referring to FIG. 3d, the VGC lock UI 202 is shown. The VGC lock 204 prompts the user 104 to select a sequence of combined input 314 from a set of alphabets, numbers, and images 316. The combined input 314 may include the alphanumeric input, the sequence of images, and/or the sequence of words. When the sequence of the combined input 314 matches the set of pre-stored data, the user 104 is authenticated for the VGC lock UI 202. The authentication enables the user 104 to perform the one or more activities on the one or more parts of the device 102.

In an embodiment, the VGC lock UI 202 may appear on the display 110 based on a predefined time of inactivity, entry into an active call, or turning-on of the device 102. In another embodiment, the user 104 may intentionally lock the device 102 to make the VGC lock UI 202 appear by using a pre-defined set of user input. In yet another embodiment, the user 104 may be allowed to customize the events that make the virtual combination lock user interface appear on the display 110.

In another embodiment, the VGC lock UI 202 may be configured to appear when the user 104 performs one or more hand gestures (for example waving, hovering over the display 110 in a clockwise or counter-clockwise direction, or moving the hand back and forth), finger gestures (for example, enumerating a sequence of numbers with fingers), facial gestures (for example, winking, smiling, or sticking out tongue) and/or body gestures (for example, tilting head, nodding head, or shaking head).

In an embodiment, the VGC lock UI 202 may be displayed on the display 110 when the device 102 is functional but does not accept most, if any, sets of user input. Thus the device 102 is prevented from performing one or more activities in response to any set of user input. In this way, the VGC lock UI 202 may be used to prevent unauthorized use of the one or more parts of the device 102.

In another embodiment, the device 102 may display the VGC lock UI 202, and may also respond to a limited set of user input. For example, a user input that allows the VGC lock UI 202 to appear or a user input that turns off the device 102. That is, the device 102 does not respond to the user input corresponding to accessing one or more parts of the device 102. Nevertheless, when the device 102 ignores the user input, a response (such as visual or audio) is provided back to the user 104 to indicate that the input will not be accepted.

In an embodiment, the device 102 displays a first set of images to the user 104. The first set of images may be generic images or pre-stored in the memory 114 or the remote resource 106. The first set of images may include a plurality of generic images and/or personalized images uploaded by the user 104. The first set of images may be displayed to the user 104 in one or more formats. The one or more formats may include, but are not limited to, a matrix format (rows and columns), a tile format with scroll bars as arrows, a scrollable row, and/or a scrollable column.

In an embodiment, the user 104 provides a user input to the device 102. The received user input may comprise a set of gestures and a selection of a plurality of images from the first set of images in a pre-determined sequence. The set of gestures may include hand gestures, finger gestures, facial gestures and/or body gestures. For example, gestures such as tapping, dragging, touching, pinching, gazing and/or the like, may be used to select a plurality of images from the first set of images in a pre-determined sequence. The pre-determined sequence is set by the user 104 during the configuration of the device 102.

The selected plurality of images is modified based on the set of gestures. For example a modification of the selected plurality of images may be rotating one or more of the selected plurality of images by twisting motion of two fingers, flipping one or more of the selected plurality of images by double tapping a finger, clipping one or more of the selected plurality of images by encircling one or more portions of the selected plurality of images, and/or generating a collage of one or more of the selected plurality of images. The collage may be generated based on selection and combination of one or more of the selected plurality of images in a pre-determined sequence, position or shape. Notwithstanding, the disclosure may not be limited only to the above examples of the modification of the selected plurality of images. Any manipulation in the selected plurality of images may be performed by using one or more of the set of gestures without limiting the scope of the disclosure.

Figure 4:
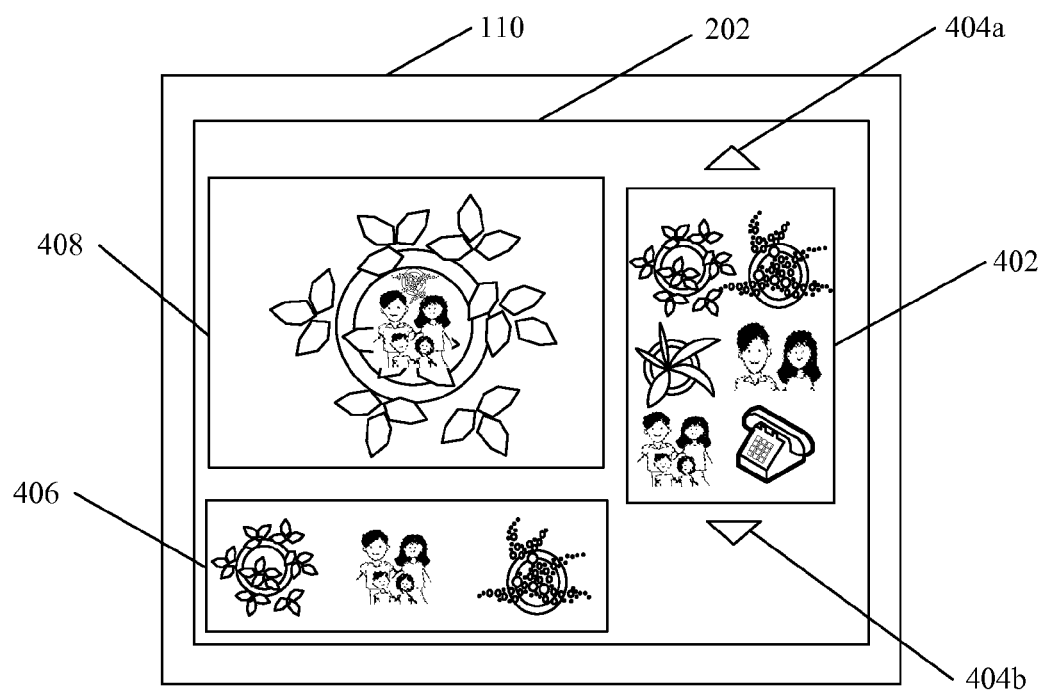
FIG. 4 is a diagram illustrating an exemplary lock user interface based on a selection of key images, in accordance with an embodiment of the disclosure.

FIG. 4 is a diagram illustrating an exemplary lock user interface based on a selection of key images, in accordance with an embodiment of the disclosure. The diagram of FIG. 4 is described in conjunction with the block diagram of FIG. 1 and FIG. 2.

Referring to FIG. 4, the VGC lock UI 202 illustrating image manipulation is shown. The user 104 is presented the first set of images 402 (such as, generic images, personal images or images uploaded by the user) on the display 110 comprising the VGC lock UI 202. Two arrows 404a and 404b facilitate in scrolling the first set of images 402 up and down as and when required for selecting the plurality of images by the user 104. The user 104 selects two or more images in a sequence as a selected set of images 406. Thereafter, the user 104 may employ one or more gestures to modify one or more of the two or more images in the selected set of images 406. The modified images comprise a pre-determined arrangement to generate the collage 408. Various examples of the image modification may include, but are not limited to, an image rotation, an image flipping, and/or an image clipping. The selection and combination of images in a specific sequence, position or shape may generate the collage 408. The processor 112 compares the collage 408 with a second set of pre-stored images. When the collage 408 matches with at least one collage in the second set of pre-stored images, the processor 112 authenticates the user 104 to perform one or more activities on one or more parts of the device 102. In an embodiment, the second set of pre-stored images may be a part of the pre-stored data. Further, the first set of images may also be a part of the pre-stored data.

In an embodiment, at least a portion of the first set of images displayed on the display 110 of the device 102 may comprise alphanumeric text. The user 104 provides a user input to the device 102 comprising a set of gestures and a selection of a plurality of images from the first set of images in a pre-determined sequence using the set of gestures. The processor 112 extracts the alphanumeric text in a sequence from the selected plurality of images. The processor 112 may execute a word recognition application to extract the alphanumeric text, for example. The processor 112, in combination with the word recognition application, may generate multiple word combinations from the extracted alphanumeric text. However, the processor 112 may limit the multiple word combinations based on the pre-determined sequence of the selection of the first set of images. In multiple embodiments, one or more words from each of the selected images may be arranged as a random set of words, a recognizable statement, a personalized phrase, and/or the like. The processor 112 compares the limited word combinations with the alphanumeric text stored in the pre-stored data in the memory 114 or the remote resource 106. Upon successful comparison, the processor 112 authenticates the user 104 to perform one or more activities on one or more parts of the device 102.

Figure 5:
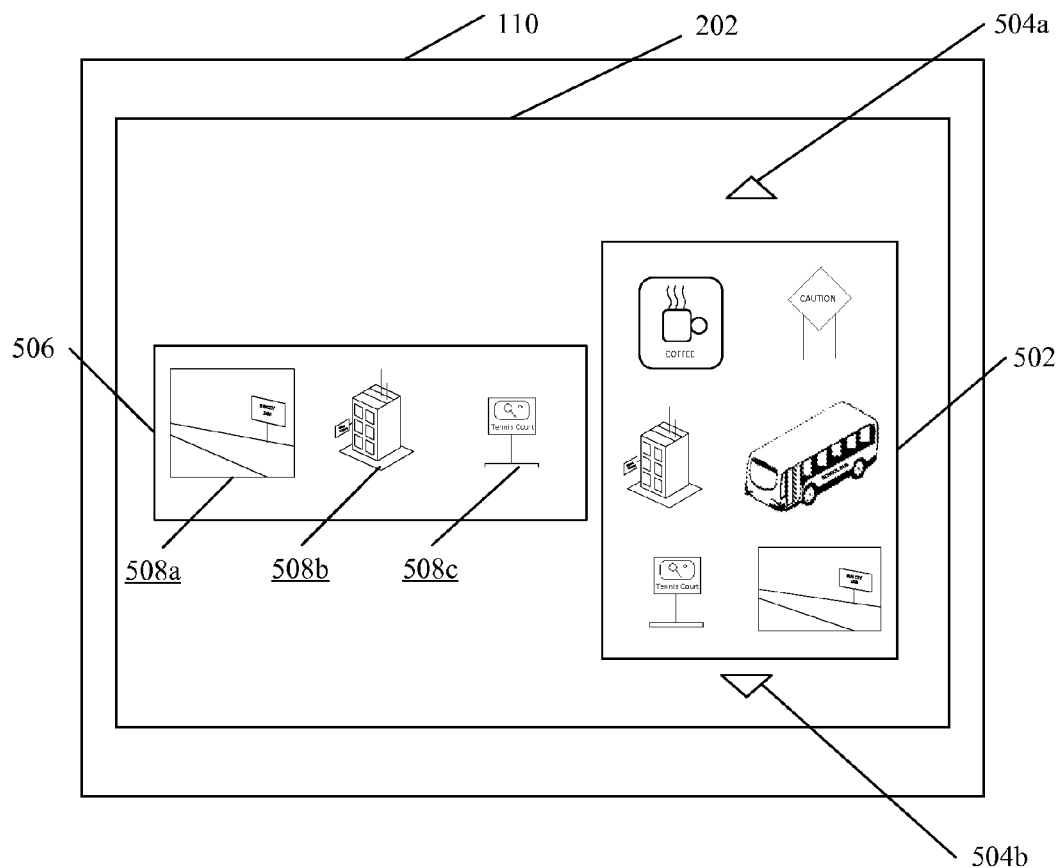
FIG. 5 is a diagram illustrating an exemplary lock user interface based on image tile selection, in accordance with an embodiment of the disclosure.

FIG. 5 is a diagram illustrating an exemplary lock user interface based on image tile selection, in accordance with an embodiment of the disclosure. The diagram of FIG. 5 is described in conjunction with the block diagram of FIG. 1 and FIG. 2.

Referring to FIG. 5, the VGC lock UI 202 based on image and word recognition is shown. The user 104 is presented the first set of images 502 (such as, generic images, personal images or images uploaded by the user) on the VGC lock UI 202. Two arrows, 504a and 504b, facilitate in scrolling the first set of images 502 up and down for selecting a plurality of images by the user 104. Two or more images comprising recognizable words are selected in a sequence as a selected set of images 506. A word recognition application may recognize one or more words from the two or more images. For example "Sun", "City" and "2 KM" from a milestone in a first image 508a, "Regus" and "Square" from building banner in a second image 508b, and "Tennis" and "Court" from a signboard in a third image 508c. The words from the first image 508a, the second image 508b, and the third image 508c in a pre-determined sequence may be combined to form a set of words, for example, "City" "Regus" "Court". The set of words is compared with a pre-stored sequence of alphanumeric text. For a successful comparison, the processor 112 authenticates the user 104 to perform one or more activities on one or more parts of the device 102.

In an embodiment, the device 102 displays a first set of images to the user 104. The first set of images may be generic images or pre-stored in the memory 114 or a remote resource 106. The first set of images may include a plurality of generic images and/or personalized images uploaded by the user 104. The first set of images may be displayed to the user 104 in one or more formats. The one or more formats may include, but are not limited to, a matrix format (rows and columns), a tile format with scroll bars as arrows, a scrollable row, and/or a scrollable column.

Figure 6:
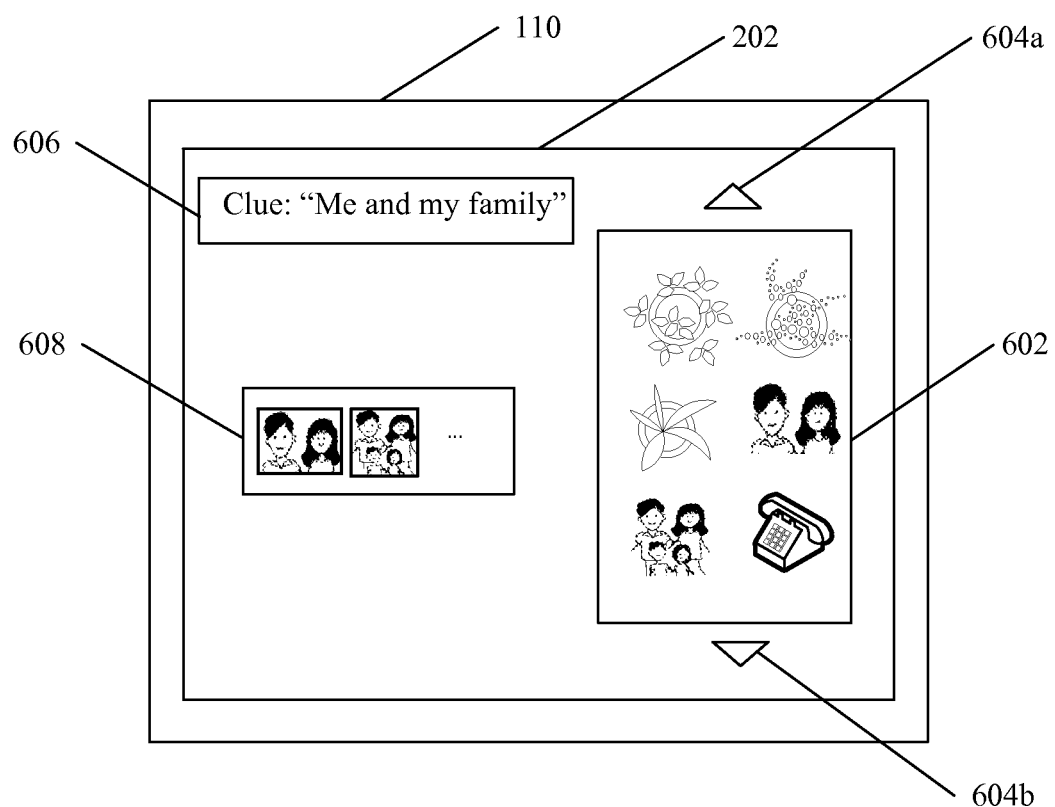
FIG. 6 is a diagram illustrating an exemplary lock user interface based on images with personal significance, in accordance with an embodiment of the disclosure.

FIG. 6 is a diagram illustrating an exemplary lock user interface based on images with personal significance, in accordance with an embodiment of the disclosure. The diagram of FIG. 6 is described in conjunction with the block diagram of FIG. 1 and FIG. 2.

Referring to FIG. 6, the VGC lock UI 202 based on images with personal significance is shown. The user 104 is presented a first set of images 602 (such as, generic images, personal images, or images uploaded by the user) on the VGC lock UI 202. Two arrows 604a and 604b facilitate in scrolling the first set of images 502 up and down as and when required for selecting a plurality of images by the user 104. In an embodiment, the user 104 is presented a pre-stored message 606, for example "Me and My Family". Based on the pre-stored message 604, the user 104 selects a plurality of images in a pre-determined sequence to be a selected set of images 608. In an embodiment, a facial recognition application may be implemented in the device 102 to identify people in the selected set of images 608. The processor compares the combination of the pre-stored message 606 and the selected set of images 608 with a plurality of pre-stored messages and tagged images from the second set of pre-stored images in the memory 114. Based on a successful comparison, the processor 112 authenticates the user 104 to perform one or more activities on one or more parts of the device 102.

In an embodiment, the received user input may comprise a set of gestures and a selection of a plurality of images from the first set of images 602 in a pre-determined sequence based on the set of gestures and the pre-stored message 606. In an embodiment, the pre-stored message 606 may be stored and tagged with a second set of pre-stored images during the configuration of the device 102. Examples of the pre-stored message may include, but are not limited to, "Me and my family", "My favorite tourist destinations", "My favorite sports", and/or "Top five favorite songs". The pre-stored message may be displayed on the VGC lock UI 202 as soon as the user 104 attempts the one or more activities on one or more parts of the device 102. In response to the displayed pre-stored message, the user 104 selects a plurality of images from the displayed first set of images. The processor 112 may compare the selected said plurality of images with a second set of pre-stored images corresponding to the pre-stored message. Based on a successful comparison, the processor 112 authenticates the user 104 to perform one or more activities on one or more parts of the device 102.

Figure 7:
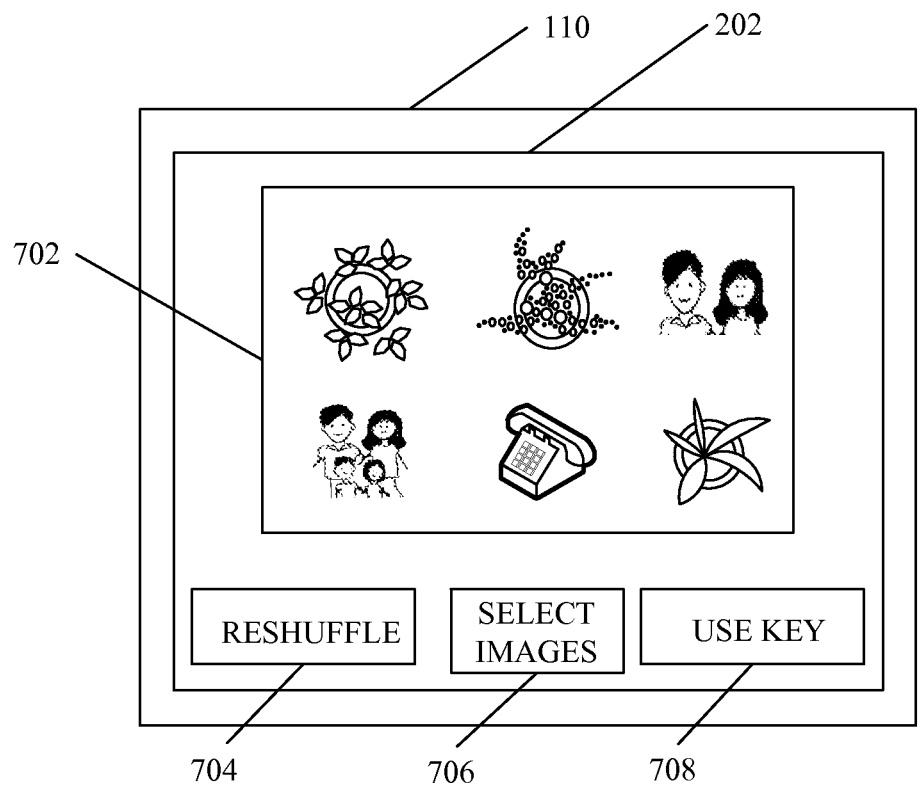
FIG. 7 is a diagram illustrating an exemplary lock user interface based on image manipulation, in accordance with an embodiment of the disclosure.

FIG. 7 is a diagram illustrating an exemplary lock user interface based on image manipulation, in accordance with an embodiment of the disclosure. The diagram of FIG. 7 is described in conjunction with the block diagram of FIG. 1 and FIG. 2.

Referring to FIG. 7, the VGC lock UI 202, based on a selection of key images by using gestures, is shown. The user 104 is presented a first set of images 702 by the processor 112. In an embodiment, the first set of images 702 may be displayed on the VGC lock UI 202 as a set of nine images arranged side by side. The arrangement enables the user 104 to move around and select a plurality of images in a pre-determined sequence. In an embodiment, the first set of images 702 may be displayed as a row that can be scrolled through to enable the user 104 to select the plurality of images in a pre-determined sequence. The VGC lock UI 202 further displays several utility buttons. A button 704, labeled as "Reshuffle" resets the first set of images 702 before providing the user input. A button 706, labeled as "Select Images" selects a plurality of images in a pre-determined sequence. A button 708, labeled as "Use Key" generates a command to compare the selected plurality of images with the pre-stored second set of images in the memory 114. The user 104 may select one or more buttons by using at least one of a set of gestures (for example, tapping or gazing). The user 104 may select the button 704 to reset the images 702 before providing a plurality of images in a pre-determined sequence as a user input to the processor 112. The user 104 may select the button 706 for enabling the first set of images 702 in a selectable mode. Thereafter, the user 104 may select a plurality of images from the first set of images 702 in a pre-determined sequence. The selected plurality of images is compared with the pre-stored second set of images in the memory 114. Based on a successful comparison, the processor 112 may authenticate the user 104 to perform one or more activities on one or more parts of the device 102.

Figure 8:
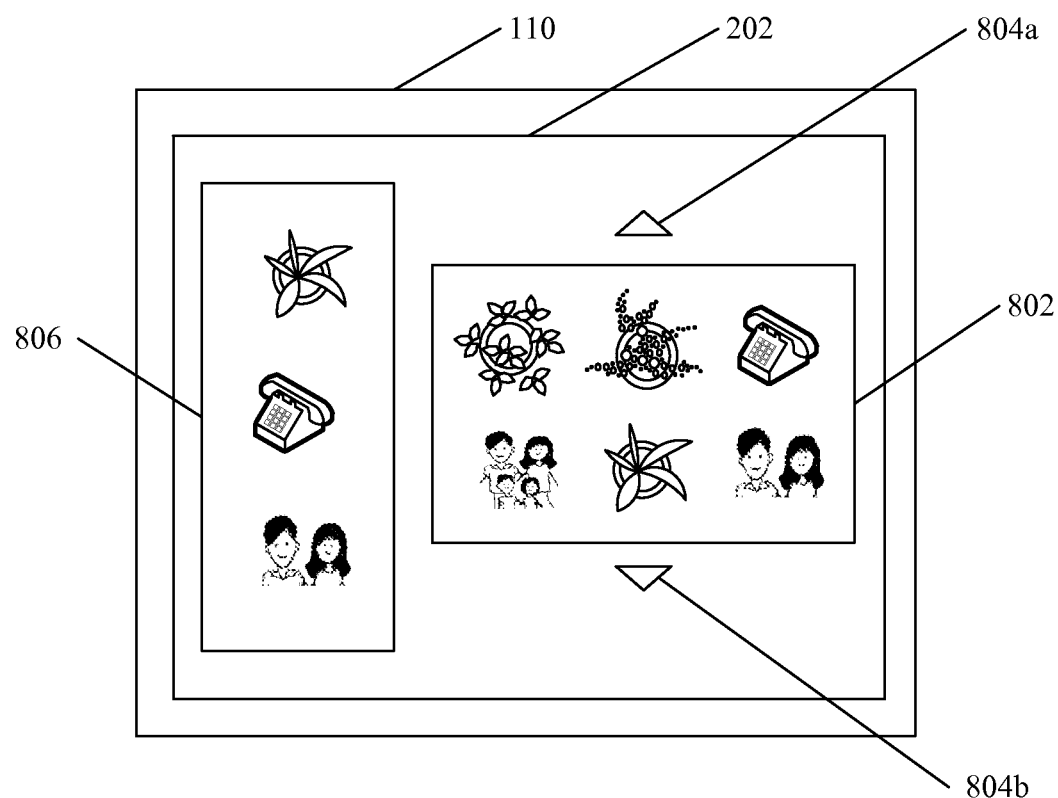
FIG. 8 is a diagram illustrating an exemplary lock user interface based on image and word recognition, in accordance with an embodiment of the disclosure.

FIG. 8 is a diagram illustrating an exemplary lock user interface based on image and word recognition, in accordance with an embodiment of the disclosure. The diagram of FIG. 8 is described in conjunction with the block diagram of FIG. 1 and FIG. 2.

Referring to FIG. 8, the VGC lock UI 202, based on image tile selection by using gestures, is shown. The user 104 is presented a first set of selectable images as a tile-set 802 by the processor 112 on the VGC lock UI 202. Two arrows, 804a and 804b, facilitate in scrolling the tile-set 802 up and down for selecting the plurality of images by the user 104. In response to the presentation, the user 104 may use at least one of the set of gestures (for example, touching, tapping or gazing) in a pre-determined sequence to select a plurality of images in a pre-determined sequence as a selected set of images 806. In an embodiment, the selected set of images 806 may be displayed as a tile-set 802 that can be zoomed in to view and select the plurality of images in a pre-determined sequence. In an embodiment, the selected set of images 806 comprises three images. In another embodiment, the number of images in the selected set of images 806 may be set by the user 104 during configuration of the device 102.

In an embodiment, the VGC lock UI 202 may be configured specifically for users with physical disabilities, based on a customized combination of user input. For users with physical disabilities, the customized combination of user input may comprise a speech input and/or the set of gestures. The user input may be customized based on type of physical disability of the user. The type of physical disability may include, but is not limited to, mobility impairment (for example dysfunctional limbs), visual impairment (for example partial sightedness/blindness), or hearing impairment (for example hard-of-hearing/deafness).

For example, for a user with dysfunctional limbs, the user input may be customized to comprise a combination of one or more spoken words and one more facial gestures (for example, winking, smiling, or sticking out tongue). For a user that is partially sighted and/or blind, the user input may be customized to comprise another combination of one or more spoken words and one more of: hand gestures (for example, pumping a fist or waving a hand), finger gestures (for example, enumerating numbers or thumbs up), the facial gestures and/or body gestures (for example, nodding head, shaking the head or tilting the head). For a user that is hard-of-hearing and/or deaf, the user input may be customized to comprise another combination of one or more of the: hand gestures, finger gestures, facial gestures and/or body gestures.

In another embodiment, the VGC lock UI 202 may be configured for professional users to provide them with additional security and protection. The VGC lock UI 202 may further be configured to be pre-determined by the user 104 for one or more functions of the device 102. In an embodiment, the processor 112 may allow only a set of users over a network, the user 104 being one of the set of the users. The processor 112 may further allow the user 104 to pre-determine the VGC lock 204 for specific functions of the device 102 (for example, a personal computer) on the network. For example, at least one gesture from the set of gestures may be used to launch an anti-virus application or prevent the user 104 from surfing the internet.

Figure 9:
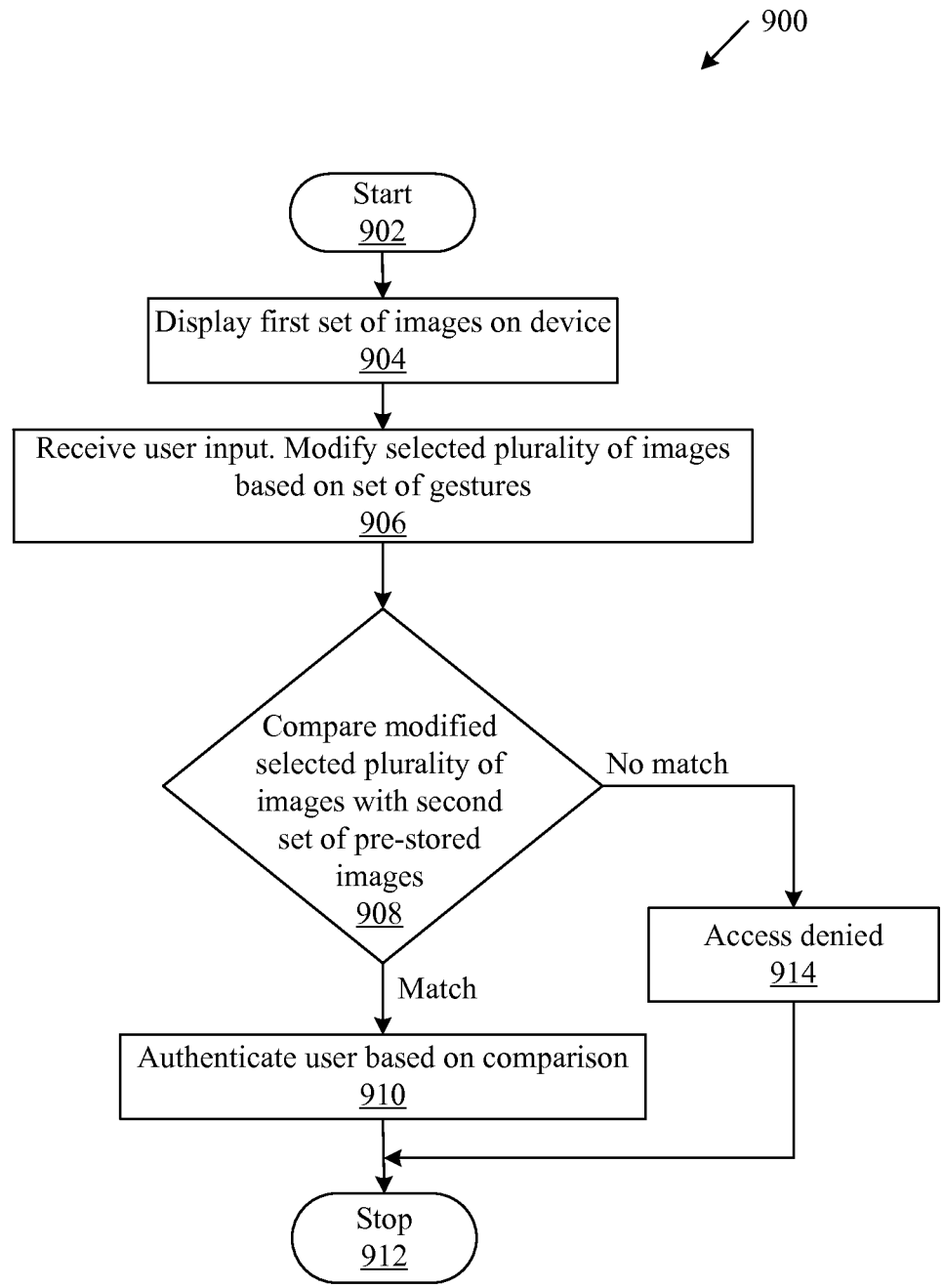
FIG. 9 is an exemplary flow chart illustrating exemplary steps for authenticating a user to access a device, in accordance with an embodiment of the disclosure.

FIG. 9 is first exemplary flow chart illustrating exemplary steps for authenticating a user to access a device, in accordance with an embodiment of the disclosure. Referring to FIG. 9, there is shown a flow chart 900. The flow chart 900 is described in conjunction with the block diagram of FIG. 1, FIG. 2, and FIG. 4.

The method starts at step 902 and proceeds to step 904. At step 904, the device 102 may display a first set of images 402 on the VGC lock UI 202 of the device 102 via the display 110. At step 906, the user 104 provides input to the device 102. The user input comprises a set of gestures and a selection of a plurality of images as a set of images 404 from the first set of images 402 in a pre-determined sequence. The selected set of images 404 are modified based on the set of gestures and a collage 408 is generated.

At step 908, the collage 408 is compared with a second set of pre-stored images in the memory 114. In instances where the collage 408 does not match with the one or more images in the second set of pre-stored images, the method proceeds to step 914. At step 914, the user 104 is denied access to the device 102. Accordingly, the user 104 is unable to perform one or more activities on one or more parts of the device 102. The method proceeds to step 912.

In instances where the collage 408 matches with one or more images in the second set of pre-stored images, the method proceeds to step 910. At step 910, the user 104 is confirmed to be an authenticated user. The authenticated user may perform one or more activities on one or more parts of the device 102. The method ends at step 912.

Figure 10:
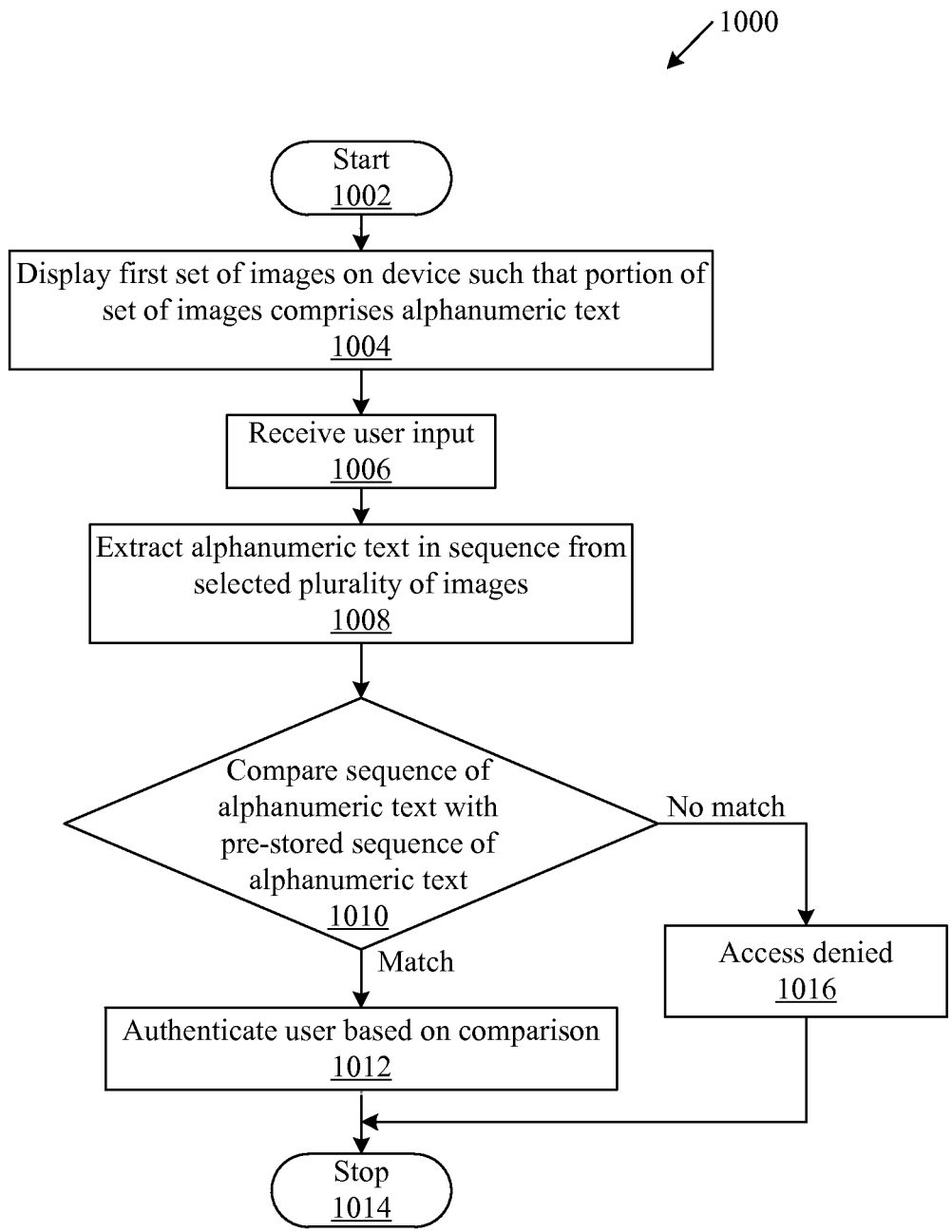
FIG. 10 is another exemplary flow chart illustrating exemplary steps for authenticating a user to access a device based on extracting an alphanumeric sequence from a selected plurality of images, in accordance with an embodiment of the disclosure.

FIG. 10 is another exemplary flow chart illustrating exemplary steps for authenticating the user 104 based on extracting an alphanumeric sequence from a selected plurality of images, in accordance with an embodiment of the disclosure. Referring to FIG. 10, there is shown a flow chart 1000. The flow chart 1000 is described in conjunction with the block diagram of FIG. 1, FIG. 2, and FIG. 5.

The method starts at step 1002 and proceeds to step 1004. At step 1004, the device 102 may display a first set of images 502 to the user 104 on the VGC lock UI 202 of the device 102 via the display 110. At least one portion of the first set of images 502 may comprise alphanumeric text. At least one portion may be a sign, a poster, or a label as illustrated in the first set of images 502.

At step 1006, the user 104 may provide input to the device 102. The user input may comprise a set of gestures and a selection of a plurality of images as a selected set of images 506 from the first set of images 502 in a pre-determined sequence.

At step 1008, the alphanumeric text is extracted in a sequence from the selected set of images 506. A word recognition application may facilitate in the extraction of the alphanumeric text from the selected set of images 506.

At step 1010, the extracted sequence of the alphanumeric text is compared with a pre-stored sequence of alphanumeric text in the memory 114. In instances where the extracted sequence of the alphanumeric text does not match with one or more pre-stored sequences of alphanumeric text, the method proceeds to step 1016. At step 914, the user 104 is denied access to the device 102. Accordingly, the user 104 is unable to perform one or more activities on one or more parts of the device 102. The method proceeds to step 1014.

In instances where the extracted sequence of the alphanumeric text matches with one or more pre-stored sequences of alphanumeric text, the method proceeds to step 1012. At step 1012, the user 104 is confirmed to be an authenticated user. The authenticated user may perform one or more activities on one or more parts of the device 102. The method ends at step 1014.

Figure 11:
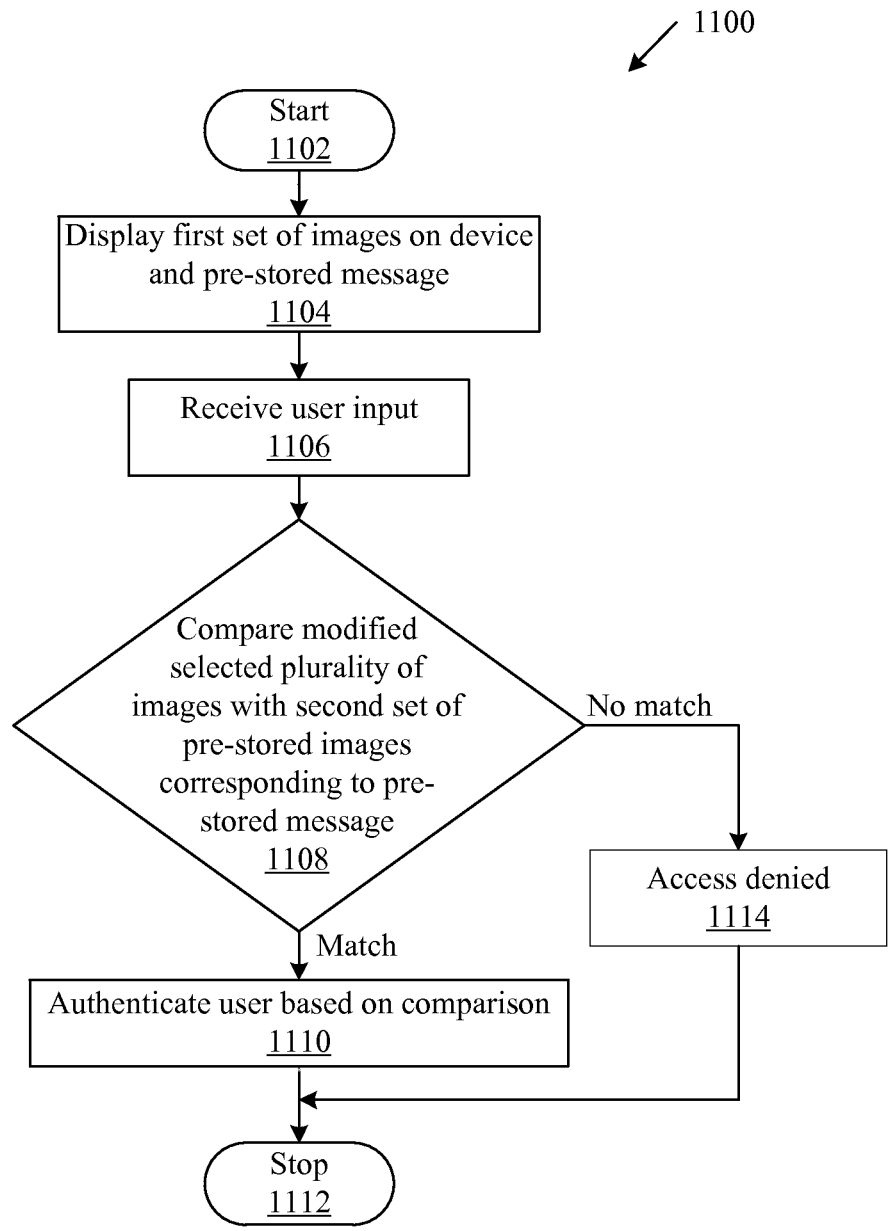
FIG. 11 is another exemplary flow chart illustrating exemplary steps for authenticating a user to access a device based on receiving a user input corresponding to a pre-stored message, in accordance with an embodiment of the disclosure.

FIG. 11 is another exemplary flow chart illustrating exemplary steps for authenticating the user 104 based on receiving a user input corresponding to a pre-stored message, in accordance with an embodiment of the disclosure. Referring to FIG. 11, there is shown a flow chart 1100. The flow chart 1100 is described in conjunction with the block diagram of FIG. 1, FIG. 2, and FIG. 6. The method starts at step 1102 and proceeds to step 1104.

At step 1104, the device 102 may display a first set of images 602 and a pre-stored message 606 on the VGC lock UI 202 of the device 102 via the display 110.

At step 1106, the user 104 provides input to the device 102. The user input comprises a set of gestures and a selection of a plurality of images as a set of images 608 from the first set of images 602, in a pre-determined sequence based on the set of gestures and the pre-stored message 606.

At step 1108, the pre-stored message 606 and the set of images 608 are compared with a second set of pre-stored images tagged with at least one pre-stored message in the memory 114. In instances where the pre-stored message 606 and the set of images 608 does not match with one or more images in the second set of pre-stored images tagged with at least one pre-stored message, the method proceeds to step 1114. At step 1114, the user 104 is denied access to the device 102. Accordingly, the user 104 is unable to perform one or more activities on one or more parts of the device 102. The method proceeds to step 1112.

In instances where the pre-stored message 606 and the set of images 608 matches with one or more images in the second set of pre-stored images tagged with the at least one pre-stored message, the method proceeds to step 1110.

At step 1110, the user 104 is confirmed to be an authenticated user. The authenticated user may perform one or more activities on one or more parts of the device 102. The method ends at step 1112.

In accordance with another embodiment of the disclosure, the device 102 (FIG. 1) for user authentication is disclosed. The device 102 comprises one or more processors (hereinafter referred to as the processor 112 (FIG. 1)), the processor 112 being operable to display a first set of images 402 (FIG. 4) on the device 102. The processor 112 may receive a user input. The user input may comprise a set of gestures and a selection of a plurality of images as a selected set of images 406 (FIG. 4) from the first set of images 402 in a pre-determined sequence. The selected plurality of images 406 may be modified based on the set of gestures to generate a collage 408 (FIG. 4). The processor 112 compares the collage 408 with a second set of pre-stored images in the memory 114 (FIG. 1). The processor may authenticate the user 104 (FIG. 1) based on the comparison.

In accordance with yet another embodiment of the disclosure, authentication of the user 104 on the device 102 is disclosed. The device 102 comprises one or more processors (hereinafter referred to as the processor 112), the processor 112 being operable to display a set of images 502 (FIG. 5) on the device 102. The processor 112 may display the set of images 502 to the user 104 on the device 102, more specifically on the VGC lock UI 202 (FIG. 2). At least a portion of the set of images 502 may comprise alphanumeric text. The processor 112 may receive a user input. The user input may comprise a selection of a plurality of images as a selected set of images 506 (FIG. 5) from the displayed set of images 502 in a pre-determined sequence. The processor 112 may extract the alphanumeric text from the selected set of images 506. The processor 112 may compare the sequence of the extracted alphanumeric text with a pre-stored sequence of alphanumeric text in the memory 114. Thereafter, the processor 112 may authenticate the user 104 based on the comparison.

In accordance with yet another embodiment of the disclosure, authentication of the user 104 on the device 102 is disclosed. The device 102 comprises one or more processors (hereinafter referred to as the processor 112), the processor 112 being operable to display a set of images 602 (FIG. 6) and a pre-stored message 606 (FIG. 6) on the device 102. The processor 112 may receive a user input. The user input may comprise a set of gestures and a selection of a plurality of images 608 (FIG. 6) from a first set of images 602 in a pre-determined sequence based on the set of gestures and the pre-stored message 606. The processor 112 may compare the selected plurality of images 608 with a second set of pre-stored images corresponding to the pre-stored message 606 in the memory 114. Thereafter, the processor 112 may authenticate the user 104 based on the comparison.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer for authenticating a user, thereby causing the machine and/or computer to perform the steps comprising displaying a first set of images on a device. A user input is received. The received user input may comprise a set of gestures and a selection of a plurality of images from the first set of images in a pre-determined sequence. The selected plurality of images may be modified based on the set of gestures. The modified plurality of images is compared with a second set of pre-stored images. The user may be authenticated based on the comparison.

In accordance with another embodiment, the disclosure may provide a non-transitory computer readable medium and/or storage medium, and/or a non-transitory machine readable medium and/or storage medium, having stored thereon, a machine code and/or a computer program having at least one code section executable by a machine and/or a computer for authenticating a user, thereby causing the machine and/or computer to perform the steps comprising displaying a set of images to a user on a device. At least a portion of the set of images may comprise alphanumeric text. A user input is received. The received user input may comprise a selection of a plurality of images from the displayed set of images in a pre-determined sequence. The alphanumeric text is extracted in a sequence from the selected plurality of images. The sequence of the extracted alphanumeric text is compared with a pre-stored sequence of alphanumeric text. The user may be authenticated based on the comparison.

In accordance with yet another embodiment, the disclosure may provide a non-transitory computer readable medium and/or storage medium, and/or a non-transitory machine readable medium and/or storage medium, having stored thereon, a machine code and/or a computer program having at least one code section executable by a machine and/or a computer for authenticating a user, thereby causing the machine and/or computer to perform the steps comprising displaying a first set of images and a pre-stored message on a device A user input is received. The received user input may comprise a set of gestures and a selection of a plurality of images from the first set of images in a pre-determined sequence based on the set of gestures and the pre-stored message. The selected plurality of images is compared with a second set of pre-stored images corresponding to the pre-stored message. The user is authenticated based on said the comparison.

Accordingly, the present disclosure may be realized in hardware, or a combination of hardware and software. The present disclosure may be realized in a centralized fashion in at least one computer system or in a distributed fashion where different elements may be spread across several interconnected computer systems. Any kind of computer system or other apparatus adapted for carrying out the methods described herein may be suited. A combination of hardware and software may be a general-purpose computer system with a computer program that, when being loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for authenticating a user, said method comprising:
    displaying a first set of images on a device;
    receiving a user input, wherein said received user input comprises:
        a set of gestures,
        a first selection for selecting a plurality of images from said first set of images in a pre-determined sequence based on said set of gestures, and
        a second selection for modifying said selected plurality of images based on said set of gestures;
    comparing said modified selected plurality of images with a second set of pre-stored images; and
    authenticating said user based on said comparing.

2. The method of claim 1, wherein said device is one of: a touch screen device, a tablet, a personal digital assistant (PDA), a touchpad device, a smartphone, or a desktop monitor.

3. The method of claim 1, wherein said set of gestures comprises one or more of: hand gestures, finger gestures, facial gestures and/or body gestures.

4. The method of claim 1, wherein said user input further comprises speech input for said first selection and said second selection.

5. The method of claim 1, wherein said modification of said selected plurality of images comprises one or more of: rotating one or more of said selected plurality of images, flipping one or more of said selected plurality of images, clipping one or more of said selected plurality of images, and/or generating a collage of one or more of said selected plurality of images.

6. The method of claim 5, wherein said collage is generated based on selection and combination of said one or more of said selected plurality of images in said pre-determined sequence, a position or a shape.

7. The method of claim 1, further comprising receiving from said user said second set of pre-stored images during a configuration of said device.

8. The method of claim 7, further comprising storing in a memory, said second set of pre-stored images in said pre-determined sequence during said configuration of said device.

9. The method of claim 7, further comprising receiving from said user a degree of complexity for performing one or more activities during said configuration of said device, wherein said degree of complexity depends upon a level of security required by said user.

10. The method of claim 1, wherein said authenticating comprises enabling said user to perform one or more activities, said one or more activities correspond to one or more of: locking said device, locking one or more features of said device, locking one or more applications of said device, unlocking said device, unlocking one or more features of said device, unlocking one or more applications of said device, and/or launching one or more applications in said device.

11. A device for user authentication, said device comprising:
one or more processors in said device, said one or more processors being operable to:
display a first set of images on said device;
receive a user input, wherein said received user input comprises:
a set of gestures,
a first selection for selecting a plurality of images from said first set of images in a pre-determined sequence based on said set of gestures, and
a second selection for modifying said selected plurality of images based on said set of gestures;
compare said modified selected plurality of images with a second set of pre-stored images; and
authenticate said user based on said comparison.

12. The device of claim 11, wherein said modification of said selected plurality of images comprises one or more of: rotating one or more of said selected plurality of images, flipping one or more of said selected plurality of images, clipping one or more of said selected plurality of images, and/or generating a collage of one or more of said selected plurality of images.

13. The device of claim 12, wherein said collage is generated based on selection and combination of said one or more of said selected plurality of images in a pre-determined sequence, a position or a shape.

14. A method for authenticating a user, said method comprising:
displaying a first set of images on a device and a pre-stored message;
receiving a user input, wherein said received user input comprises:
a set of gestures;
a first selection of a plurality of images from said first set of images in a pre-determined sequence based on said set of gestures and said pre-stored message displayed on said device; and
a second selection for modifying said selected plurality of images based on said set of gestures;
comparing a combination of said pre-stored message and said selected plurality of images with a combination of a plurality of pre-stored messages and a second set of pre-stored images; and
authenticating said user based on said comparing.

15. The method of claim 14, wherein a plurality of images in said second set of pre-stored images are tagged with at least one of said plurality of pre-stored messages.

16. The method of claim 15, further comprising associating at least one of said plurality of images in said second set of pre-stored images with said pre-stored message during a configuration of said device.

17. The method of claim 15, wherein said plurality of images in said second set of pre-stored images includes a plurality of personal images uploaded by said user.

18. The method of claim 14, wherein said authenticating comprises enabling said user to perform one or more activities, said one or more activities correspond to one or more of: locking said device, locking one or more features of said device, locking one or more applications of said device, unlocking said device, unlocking one or more features of said device, unlocking one or more applications of said device, and/or launching one or more applications of said device.

* * * * *